United States Patent
Johnson et al.

(10) Patent No.: US 6,498,792 B1
(45) Date of Patent: Dec. 24, 2002

(54) METHOD AND APPARATUS FOR SWITCHING SIGNALS OF MULTIPLE DIFFERENT COMMUNICATION PROTOCOLS

(75) Inventors: Gary P. Johnson, McKinney, TX (US); Roland J. Moubarak, Garland, TX (US); Masahiro Shimbashi, Kawasaki (JP); Katsuya Shirota, Richardson, TX (US); David X. Chen, Plano, TX (US)

(73) Assignee: Fujitsu Network Communications, Inc., Richardson, TX (US)

( * ) Notice: Subject to any disclaimer, the term of this patent is extended or adjusted under 35 U.S.C. 154(b) by 0 days.

(21) Appl. No.: 09/325,689

(22) Filed: Jun. 3, 1999

(51) Int. Cl.⁷ .............................. H04L 12/50
(52) U.S. Cl. .................. 370/388; 370/466; 370/376
(58) Field of Search ................ 370/422, 423, 370/426, 375, 376, 388, 466, 907

(56) References Cited

U.S. PATENT DOCUMENTS

| | | | |
|---|---|---|---|
| 4,339,633 A | 7/1982 | Ahmed | 179/99 M |
| 4,592,048 A | 5/1986 | Beckner et al. | 370/60 |
| 4,631,641 A | 12/1986 | Brombal et al. | 361/424 |
| 4,926,416 A | 5/1990 | Weik | 370/60.1 |
| 4,959,833 A | 9/1990 | Mercola et al. | 371/32 |
| 5,345,446 A | 9/1994 | Hiller et al. | 370/60.1 |

(List continued on next page.)

FOREIGN PATENT DOCUMENTS

| | | | | |
|---|---|---|---|---|
| EP | 0 528 206 A2 | 2/1993 | | |
| EP | 0 529 649 A2 | 3/1993 | ............. | H04J/1/00 |
| EP | 0 818 940 A2 | 1/1998 | | |
| WO | WO 95/26600 | 10/1995 | ........... | H04L/12/56 |
| WO | WO 95/30318 | 11/1995 | | |

OTHER PUBLICATIONS

PCT International Search Report in International Application No. PCT/US00/15340, dated Oct. 19, 2000, 6 pages.
International Search Report in PCT International Application No. PCT/US00/15339, dated Nov. 17, 2000, 6 pages.
PCT Written Opinion in International Application No. PCT/US00/15332, dated Aug. 13, 2001, 4 pages.
PCT Written Opinion in International Application No. PCT/US00/15426, dated, Jun. 26, 2001, 5 pages.
Bernie Assa, "Today's Transport Networks—Are They Ready for ATM?," *National Fiber Optic Engineers Conference Proceedings*, Sep. 8–12, 1996, 16 pages.

(List continued on next page.)

*Primary Examiner*—Chau Nguyen
*Assistant Examiner*—D. Trinh
(74) *Attorney, Agent, or Firm*—Baker Botts L.L.P.

(57) ABSTRACT

A telecommunications switching apparatus (10) includes optical paths (16–19) coupled to interface cards (26–29), which in turn are coupled to a switching circuit (41–42). The switching circuit is coupled to a plurality of universal connectors (71–74), each of which is coupled to an auxiliary connector (77–78). The universal connectors can each removably receive any one of several types of switching circuit cards (101–104), which each utilize a respective one of several different communication protocols. An auxiliary circuit card (107–108) may be provided in the associated auxiliary connector, in order to support switching circuit cards that use certain communication protocols. The optically transmitted information includes segments formatted according to respective communication protocols, and is converted from optical to electrical form by the interface cards. The switching circuit then routes each segment to a respective universal connector containing a switching circuit card that effects switching according to the communication protocol of that segment.

18 Claims, 1 Drawing Sheet

U.S. PATENT DOCUMENTS

| | | | | |
|---|---|---|---|---|
| 5,365,524 A | | 11/1994 | Hiller et al. | 370/94.2 |
| 5,396,491 A | * | 3/1995 | Newman | 370/355 |
| 5,398,236 A | | 3/1995 | Hemmady et al. | 370/218 |
| 5,412,652 A | | 5/1995 | Lu | 370/85.12 |
| 5,467,348 A | | 11/1995 | Fujii et al. | 370/60.1 |
| 5,519,700 A | | 5/1996 | Punj | 370/419 |
| 5,526,359 A | | 6/1996 | Read et al. | 370/100.1 |
| 5,594,729 A | | 1/1997 | Kanakia et al. | 370/391 |
| 5,729,536 A | | 3/1998 | Doshi et al. | 370/328 |
| 5,793,760 A | | 8/1998 | Chopping | 370/355 |
| 5,796,720 A | | 8/1998 | Yoshida et al. | 370/245 |
| 5,805,568 A | | 9/1998 | Shinbashi | 370/223 |
| 5,812,796 A | | 9/1998 | Broedner et al. | 395/283 |
| 5,838,924 A | | 11/1998 | Anderson et al. | 395/200.69 |
| 5,844,887 A | | 12/1998 | Oren et al. | 370/218 |
| 5,864,553 A | * | 1/1999 | Aramaki | 370/392 |
| 5,867,484 A | | 2/1999 | Shaunfield | 370/254 |
| 5,920,412 A | | 7/1999 | Chang | 359/128 |
| 5,953,330 A | | 9/1999 | Canniff et al. | 370/352 |
| 5,963,553 A | | 10/1999 | Wicklund | 370/390 |
| 6,125,111 A | | 9/2000 | Snow et al. | 370/360 |
| 6,141,346 A | | 10/2000 | Caldara et al. | 370/390 |
| 6,266,333 B1 | * | 7/2001 | Kartalopoulos | 370/395 |
| 6,134,238 A1 | | 10/2001 | Noh | 370/395 |

OTHER PUBLICATIONS

International Preliminary Examination Report in International Application No. PCT/US00/15332, dated Jan. 10, 2002, 4 pages.

International Search Report in International Application No. PCT/US 00/15332, dated Sep. 21, 2000, 6 pages.

PCT International Search Report in International Application No. PCT/US 00/15129, dated Aug. 21, 2000, 7 pages.

Tai H. Noh, "ATM Scenarios for SDH/SONET Networks XP–000750438," Bell Labs Technical Journal, Jan., 1998, 13 pages.

McDysan, David E., et al., ATM Theory and Application. McGraw–Hill, Inc. ISBN 0–07–060362–6, pp. 365–385, 1994.

Erdengiz, Ali, "ATM Usage Policing and Traffic Shaping," Communications System Design (Jan. 1997).

Dobrowski, George et al., ATM User–Network Interface Specification, Version 3.1, The ATM Forum, Sep., 1994.

Cerent 454™ High Speed SONET/SDH Transport System, ALTS trade show, Las Vegas, Nevada on or about Dec., 1998.

"FLM 150 ADM LAN Extension Product Design Specification," Revision 1.1, Internal Design Specification for Product, sheets 6/353–10/353 and 72/353–75/353, Product publicly released on or about Dec., 1998.

"Product Design Specification (PDS) for FLASH–192, Release 1," Internal Design Specification for Product, pp. 1/916; 4–12/9161 315–320/916, Product publicly released on or about Mar., 1999.

"InterNetworking Systems; AnyMedia® Access Products; AnyMedia Access System," http://www.lucent.com/ins/products/anymedia.html, Printed Aug. 10, 2000.

"AnyMedia® Access System," Lucent Technologies, Inc. Marketing Communications, Sep., 1999.

"The AnyMedia™ Access System Anything's Possible," Lucent Technologies, Inc. Marketing Communications, 1997.

Photography of Northern Telecom Card, card dated Apr., 1998.

Held, G., Understanding Data Communications, Fifth Edition, Sams Publishing. ISBN No. 0–672–30934–3, Chapter 14, pp. 419–431, 1996.

McCloghrie, K., et al., "Management Information Base for Network Management of TCP/IP–based internets: MIB–II," SNMP Working Group, Mar., 1991.

"Draft New Recommendation 1.630 (ATM Protection Switching)," ITU Telecommunication Standardization Sector, COM 13–41–E, Sep., 1998.

Guérin, R., et al.,"Equivalent Capacity and its Application to Bandwidth Allocation in High–Speed Networks," IEEE Journal on Selected Areas in Communications, vol. 9, No. 7, pp. 968–981, Sep., 1991.

Gün, L., et al., "Bandwidth Management and Congestion Control Framework of the Broadband Network Architecture," Computer Networks and ISDN Systems 26, Elsevier Science Publishers B.V., North–Holland, pp. 61–78, 1993.

"S/DMS TransportNode 'OC–3 Express'—Cost–Effective SONET Transport for Low–Capacity Applications", Northern Telecom Marketing Publications, Issue 1, pp. 1–31, Sep. 27, 1996.

Universal Serial Bus Specification Revision 1.1, Compaq Computer Corporation, Intel Corporation, Microsoft Corporation, NEC Corporation, Sep. 23, 1998.

"MMC Porducts," http://www.mc–net.com/top–roducts/productdescriptions.html, Printed Jul. 22, 1999.

"MMC Network's Products: AnyFlow 5400," http://www.mmcnet.com/Solutions/anyflow5400.asp, Printed Feb. 7, 2000.

"MMC Network's Products: AnyFlow 5500," http://www.mmcnet.com/Solutions/anyflow5500.asp, Printed Feb. 7, 2000.

"AnyFlow 5400 Product Overview," MMC Networks, Undated.

"AnyFlow 5500 Product Overview," MMC Networks, Undated.

SwitchStAR™ ATM Cell Based 8 X 8 Non–Blocking Single Chip Switching Memory, Preliminary IDT77V400, Commercial Temperature Range, Integrated Device Technology, Inc., pp. 1–23, May, 1998.

SwitchStAR™ ATM Cell Based 8 X 8 Non–Blocking Single Chip Switch Controller, Preliminary IDT77V500, Commercial Temperature Range, IntegratedDevice Technology, Inc., pp. 1–14, May, 1998.

Giroux, Natalie et al., Traffic Management Specification, Version 4.0, af–tm–0056.000, The ATM Forum, Apr., 1996.

M4 Interface Requirements and Logical MIB, af–nm–0020.000, The ATM Forum, Oct., 1994.

* cited by examiner

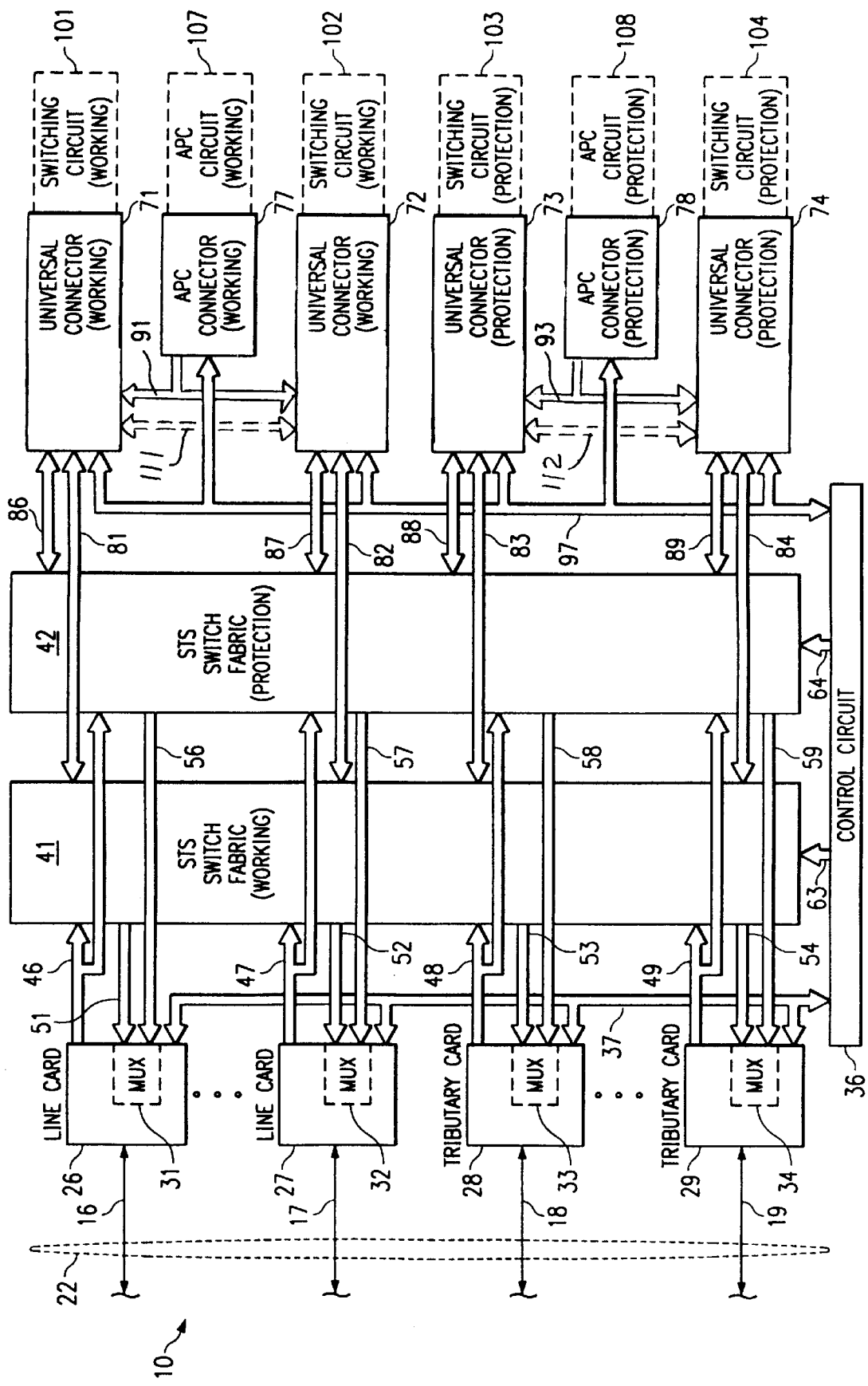

METHOD AND APPARATUS FOR SWITCHING SIGNALS OF MULTIPLE DIFFERENT COMMUNICATION PROTOCOLS

TECHNICAL FIELD OF THE INVENTION

This invention relates in general to a method and apparatus for switching telecommunications signals and, more particularly, to such a method and apparatus which implement a hybrid transport capable of handling both synchronous and asynchronous communication protocols.

BACKGROUND OF THE INVENTION

In existing telecommunication networks, various different communication protocols may be used. One such protocol is known as the virtual tributary (VT) protocol. According to this protocol, which is a synchronous protocol, a given user of a communication path is allocated time slices at predetermined periodic intervals. Another common communication protocol, which is an asynchronous protocol, is known as the asynchronous transport mode (ATM). Yet another asynchronous communication protocol is the Internet protocol (IP). According to each of the ATM and IP communication protocols, a given user of a communication path receives time slices which are not periodic, but which instead occur at variable or random points in time.

Until recently, the amount of asynchronous traffic in telecommunications networks was small in comparison to the amount of synchronous traffic. More recently, however, due in part to the popularity of personal computers and the Internet, the amount of asynchronous traffic traveling through telecommunications networks has been progressively and rapidly increasing. The traditional hardware approach was to provide completely separate switching systems for synchronous traffic and asynchronous traffic. However, as the amount of asynchronous traffic has increased, this has become a less desirable approach. In particular, there has been a progressively increasing demand from network users and telecommunications companies for hybrid switching systems which are capable of efficiently and reliably handling both synchronous traffic and asynchronous traffic.

One existing system uses a line card to terminate a fiber optic path which carries information formatted according to the SONET (Synchronous Optical NETwork) industry standard. According to the SONET standard, information is transmitted in packets known as frames, where each frame includes some overhead information and several data segments. Each data segment includes data formatted according to one of several different industry standard communication protocols, and different data segments in the same frame may conform to different communication protocols. In this existing system, the line card is coupled by respective different interfaces to respective dedicated connectors, where each connector corresponds to a respective communication protocol and can each be detachably coupled to a switching circuit card that effects switching according to that respective protocol. The line card terminates the optical path by converting the transmitted information from an optical format to an electrical format. Further, the line card terminates the SONET communication by demapping the SONET frame, so as to organize the data segments according to the specific communication protocols by which the data is formatted. The line card then routes each data segment to the connector and switching circuit card that correspond to the same communication protocol as that data segment. While this existing approach has been generally adequate for its intended purposes, it has not been satisfactory in all respects.

More specifically, because each connector must be dedicated to a particular communication protocol, extra connectors must be provided for each communication protocol of interest, which leads to a relatively large number of extra connectors of various types in any given system, which in turn increases the overall system size. The larger the system, the more space it takes up in a central facility, a terminal application, or the like. Further, providing separate and different types of electrical interfaces to the respective types of connectors for the various communication protocols has the effect of increasing the complexity and cost of the backplane wiring in the system. Moreover, maintenance of the system is complicated by the fact that maintenance personnel must be careful to plug a given switching circuit card only into the proper connector, not just to ensure proper system operation, but also to avoid possible damage to system circuitry. In addition, due to the fact that each line card not only terminates a fiber optic path, but also has to terminate the SONET frame and then route the data segments to respective different switching circuits, the circuitry of the line cards is relatively sophisticated and expensive.

SUMMARY OF THE INVENTION

From the foregoing, it may be appreciated that a need has arisen for a method and apparatus which facilitate switching of data according to multiple communication protocols, while minimizing the size, complexity and cost of the system hardware. According to the present invention, a method and apparatus are provided to address this need, and involve switching communication information containing information segments that each conform to one of a plurality of different communication protocols, in particular by: transmitting the communication information through a communication path section which includes a plurality of communication paths, each of the communication paths carrying a respective portion of the communication information; providing a plurality of universal connectors which are each adapted to be selectively detachably electrically coupled to any of a plurality of types of switching circuits, each type of switching circuit carrying out switching according to a respective one of the communication protocols; and causing a switching section to route the information segments which conform to each respective communication protocol through a respective interface to a respective universal connector having detachably coupled thereto one of the switching circuits which effects switching according to that respective communication protocol, the interfaces being effectively the same.

BRIEF DESCRIPTION OF THE DRAWINGS

A better understanding will be realized from the detailed description which follows, taken in conjunction with the accompanying drawing, in which FIG. 1 is a diagrammatic view of part of a telecommunications system, showing a switching apparatus which embodies the present invention.

DETAILED DESCRIPTION OF THE INVENTION

FIG. 1 is a block diagram of a switching apparatus 10 which is part of a telecommunications system. The apparatus includes a plurality of communication paths, four of which are shown at 16–19 in FIG. 1. The communication paths collectively serve as a communication section of the system, which is designated in FIG. 1 by reference numeral 22.

In the disclosed embodiment, the communication paths 16–19 are each implemented as a fiber optic path, and information is transmitted along these fiber optic paths using an industry standard known as SONET (Synchronous Optical NETwork). According to the SONET standard, information is transmitted in packets which are known as frames, where each frame includes some overhead information and several data segments. Each data segment includes data formatted according to one of several different industry standard communication protocols. In the disclosed embodiment, these protocols include the asynchronous transport mode (ATM), virtual tributary (VT), and Internet protocol (IP). However, the present invention is compatible with other existing or future communication protocols. Further, although the communication paths 16–19 in the disclosed embodiment are fiber optic paths which use the SONET standard, it will be recognized that other standards or types of communication paths could be used.

The switching apparatus 10 also includes a plurality of line cards which are each coupled to a respective one of the communication paths 16–19, two of the line cards being shown at 26 and 27 in FIG. 1. The apparatus 10 further includes a plurality of tributary cards which are each coupled to a respective one of the communication paths 16–19, two of the tributary cards being shown at 28 and 29 in FIG. 1. The line cards and tributary cards contain circuitry of a known type, and serve as an interface circuits which operatively interface respective fiber optic communication paths 16–19 to other components in the apparatus 10, as discussed in more detail below. Each of the cards 26–29 includes a respective two-to-one multiplexer section 31–34, the purpose of which is discussed later.

The apparatus 10 also includes a control circuit 36, which provides control signals to various other components within the switching apparatus 10. The control circuit 36 includes circuitry of a known type, which may for example include an automatic protection switching hub circuit (APS/HUB), a network element central processing unit (NE-CPU), and a digital communication channel (DCC) processor. The control circuit 36 communicates at 37 with each of the cards 26–29. The control signals at 37 include information used to control the multiplexer sections 31–34.

The switching apparatus 10 also has two synchronous transport signal (STS) switching circuits 41 and 42, which include known types of switching circuits. The circuits 41 and 42 are effectively identical in the disclosed embodiment. Switching circuit 41 is a working circuit, and switching circuit 42 is a protection or back-up circuit, which provides redundancy. That is, all operational switching is normally done by the switching circuit 41, but the switching circuit 42 can be used in lieu of circuit 41 in the event that a fault develops in circuit 41.

Each of the line cards 26–29 has an output port which is coupled through a respective interface 46–49 to a respective input port of the switching circuit 41, and also to a respective input port of the switching circuit 42. The switching circuit 41 has several output ports which are each coupled through a respective interface 51–54 to a first input port of a respective multiplexer 31–34 in the cards 26–29, and the switching circuit 42 has a plurality of output ports which are each coupled through a respective interface 56–59 to a second input port of each of the multiplexers 31–34. The switching circuits 41 and 42 are respectively controlled at 63 and 64 by the control circuit 36.

The switching apparatus 10 also has four universal connectors 71–74, and two ATM Processing Control (APC) connectors 77 and 78. The universal connectors 71 and 72 and the APC connector 77 are the working components, whereas connectors 73–74 and 78 are the corresponding protection components. The universal connectors 71–74 are each coupled with the switching circuit 41 through a respective interface 81–84, and with the switching circuit 42 through a respective interface 86–89. The APC connector 77 is coupled by an interface 91 to each of the universal connectors 71 and 72. Similarly, the APC connector 78 is coupled by an interface 93 to each of the universal connectors 73 and 74. The control circuit 36 is coupled by lines 97 to the universal connectors 71–74 and the APC connectors 77 and 78. In the disclosed embodiment, the interfaces 81–84 and 86–89 which couple the connectors 71–74 to the switching circuits 41 and 42 are effectively identical to the interfaces 46–49, 51–54 and 56–59 which couple the cards 31–34 to the switching circuits 41 and 42. In the disclosed embodiment, all of these interfaces are implemented using a type of interface known to those skilled in the art, and use a technique known in the art as low voltage differential signaling (LVDS).

The universal connectors 71–74 can each be detachably coupled to a respective switching circuit card or module, which are shown diagrammatically at 101–104, and which each include circuitry of a known type. Each of the switching circuit cards 101–104 can be any one of several different types of switching circuit cards, each of which carries out switching according to a respective one of the communication protocols used in the communication path section 22. For example, in the disclosed embodiment, the switching circuit card 101 could be a first type of card which effects switching according to the ATM communication protocol, a second card which effects switching according to the VT communication protocol, or a third card which effects communication according to the IP communication protocol. It will be recognized that, if the communication path section 22 handles information which is formatted according to some other communication protocol, each of the universal connectors 71–74 could be detachably coupled to a switching circuit which effects switching according to that particular communication protocol. It is not a requirement of the system that all of the connectors 71–74 be populated with switching circuit cards. However, connectors 73 and 74 are respectively the protection counterparts of working connectors 71 and 72, and therefore if a card is present at 101, then an equivalent card of the same type will normally be present at 103, and if a card is present 102, an equivalent card of the same type will normally be present at 104.

The APC connectors 77 and 78 can each be detachably coupled to a respective APC circuit card 107 and 108. The APC circuit cards 107 and 108 include circuitry of a known type, which provides support for switching circuit cards that use asynchronous communication protocols such as the ATM communication protocol or the IP communication protocol. Thus, if the universal connectors 71 and 72 each contain either a switching card for a synchronous protocol (such as such a VT switching circuit card), or else no card at all, then it is not necessary to populate the connector 77 with an APC circuit card 107. In contrast, if either of the connectors 71 and 72 contains a switching circuit card for an asynchronous protocol such as the ATM communication protocol or the IP communication protocol, then the APC circuit card 107 is provided in the connector 77. In a similar manner, if each of the universal connectors 73 and 74 is either empty or coupled to a VT communication protocol card at 103 or 104, then the APC connector 78 will be left empty. On the other hand, if either of the universal connectors 73 and 74 contains an asynchronous switching circuit card such as an ATM communication protocol card or an IP communication protocol card, then the APC connector 78 must be coupled to the APC circuit card 108.

The universal connectors 71 and 72 may optionally be coupled to each other by lines 111. If the universal connectors 71 and 72 are each detachably coupled to switching circuit cards 101 and 102 which use the same protocol, for example the ATM protocol, the cards 101 and 102 may communicate with each other through the lines 111, for example so that they appear to be a single large switching circuit having twice the size of either of the cards 101 and 102 alone. In a similar manner and for similar reasons, the universal connectors 73 and 74 may optionally be coupled to each other by lines 112.

The operation of the disclosed embodiment of FIG. 1 will now be explained. In order to avoid unnecessary complexity, the disclosed embodiment will be discussed in the context of a specific exemplary configuration which uses only two communication protocols. In particular, for the sake of this explanation, it is assumed that the communication path section 22 is carrying information according to the ATM communication protocol and the VT communication protocol. Further, it is assumed that the universal connector 71 is detachably coupled to a switching circuit card 101 which is of a type that effects switching according to the ATM communication protocol, and that the universal connector 72 is detachably coupled to a switching circuit card 102 which is of the type that effects switching according to the VT communication protocol. Since the card 101 and the connector 71 utilize the ATM communication protocol, which requires APC support, the APC connector 77 will be detachably coupled to an APC circuit card 107.

As discussed above, the switching circuit 42, universal connectors 73–74, APC connector 78, switching circuit cards 103 and 104, and APC circuit cards 108 respectively provide back-up protection for the switching circuit 41, universal connectors 71–72, APC connector 77, switching circuit cards 101–102 and APC circuit card 107. The protection portion of the system will be set up to essentially mirror the working portion of the system. Thus, the universal connector 73 will include a switching circuit card 103 which is of the type that effects switching according to the ATM communication protocol, the universal connector 74 will include a switching circuit card 104 which is of the type that effects switching according to the VT communication protocol, and the APC connector 78 will be coupled to an APC circuit card 108. For simplicity, the following explanation discusses the operation of the system primarily with reference to the working components, and with only limited reference to the protection components. Also, the following discussion focuses on communication path 16 and line card 26, but it will be recognized that the discussion is equally applicable to the other communication paths 17–19 and the other cards 27–29. As discussed above, information received across communication path 16 will be in the form of optical communications which conform to the SONET standard, involving a series of frames that each include a plurality of data segments. Each data segment will include information to be handled according to one of the ATM protocol or the VT protocol. The segments in a given frame may all be formatted for the ATM protocol, may all be formatted for the VT protocol, or may be a mixture of ATM and VT information.

The line card 26 terminates the optical communication, in that it converts the optical signal into electrical signals, which are supplied across the interface 46 to the switching circuit 41. The line card 26 does not terminate the SONET payload, or in other words does not break up each SONET frame and then organize the information in that frame by communication protocol. Instead, the line card 26 passes received SONET frames across the interface 46 to the switching circuit 41, in an electrical rather than optical format.

The switching circuit 41 terminates the SONET frames, in particular by extracting the various data segments and organizing them according to whether they are formatted for the ATM protocol or the VT protocol. The data segments which represent ATM traffic are then sent through the interface 81 and connector 71 to the switching circuit card 101, whereas the data segments which represent VT traffic are sent through the interface 82 and connector 72 to the switching circuit card 102. The switching circuit card 101 effects switching according to the ATM protocol, with support from the APC circuit card 107, and the switching circuit card 102 effects switching according to the VT protocol.

Outbound ATM traffic from the switching circuit card 101 is sent through the connector 71 and interface 81 to the switching circuit 41, and outbound VT traffic from the switching circuit card 102 is sent through the connector 72 and interface 82 to the switching circuit 41. The switching circuit 41 then reformats this outbound ATM and VT traffic into SONET frames. The resulting SONET frames are then transmitted across the interface 51 to the line card 26. Unless a fault has been detected in the switching circuit 41, the multiplexer 31 in line card 26 will be set to receive information across interface 51 from the circuit 41, rather than across interface 56 from the circuit 42. The line card 26 takes the SONET frames received across interface 51, converts them from electrical format into optical format, and then transmits them across the communication paths 16 of the communication path section 22.

The present invention provides a number of technical advantages. One such technical advantage is that the universal connectors are each capable of receiving one of at least two types of switching circuit cards, which each effect switching according to a respective different communication protocol. The provision of this capability reduces the overall size of an actual system, because it avoids the need to provide excess dedicated connectors for every one of the various communication protocols in order to have reasonable flexibility to expand the switching capability of the system for any given protocol. Avoiding the need for these excess dedicated connectors will in turn decrease the overall effective size of the system. Reduced size allows the customer to save valuable space, not only in a central facility, but also in remote terminal applications.

A further advantage is that the provision of universal slots simplifies maintenance considerations, because a given switching circuit card can be plugged into any connector, whereas conventional dedicated connectors make it necessary to ensure that a given card is plugged only into the proper type of connector, in order to avoid both system inoperability and possible damage to circuitry. Yet another advantage is that, by avoiding separate dedicated paths to various types of dedicated connectors, the complexity and cost of the backplane wiring is reduced. Yet another advantage is that, because the line cards and the tributary cards of the disclosed embodiment terminate only the fiber optic transmission, rather than the SONET frames, these cards have reduced complexity in comparison to existing line cards, which in turn translates into reduced cost. Still another advantage is that the cross-coupled interfaces between the switching circuits and the universal connectors facilitate bank switching in the event of card failures.

Although one embodiment has been illustrated and described in detail, it will be understood that various substitutions and alterations can be made therein without departing from the present invention. For example, the disclosed embodiment includes four universal connectors, two of which are working connectors and two of which are associated protection connectors, but it will be recognized that the present invention encompasses the use a greater number of universal connectors in the system. A further example is that the disclosed embodiment is presented in the specific context of communication protocols such as ATM, VT and IP, and the operation of the disclosed embodiment is discussed in the context of a specific exemplary configuration which uses the ATM and VT protocols, but it will be recognized that the invention encompasses the use of a variety of existing or future protocols.

A further example is that the disclosed embodiment uses communication paths which are fiber optic paths and which utilize the SONET standard, but it will be recognized that the present invention could encompass the use of a non-optical and/or a non-SONET approach. It will also be recognized that direct connections disclosed herein could be altered, such that two disclosed components or elements would be coupled to one another through an intermediate device or devices, without being directly connected, but while still realizing the present invention. Other substitutions and alterations are also possible without departing from the spirit and scope of the present invention, as defined by the following claims.

What is claimed is:

1. An apparatus, comprising:
   a communication path section operative to carry communication information which includes information segments that each conform to one of a plurality of different communication protocols, said communication path section including a plurality of communication paths which each carry a respective portion of said communication information;
   a plurality of universal connectors which are each adapted to be selectively detachably electrically coupled to any of a plurality of types of switching circuits, each said type of switching circuit carrying out switching according to a respective said communication protocol; and
   a switching section which is operatively coupled to each of said communication paths, and which is operatively coupled to each of said universal connectors through a respective one of a plurality of interfaces which are the same, said switching section being operative to route the information segments from said communication path section which conform to each respective said communication protocol through a respective said interface to a respective said universal connector having detachably coupled thereto one of said switching circuits which effects switching according to that respective said communication protocol.

2. An apparatus according to claim 1, including an auxiliary connector arrangement operatively coupled to each of said universal connectors, said auxiliary connector arrangement being adapted to be selectively detachably electrically coupled to an auxiliary card in a manner so that one of said universal connectors which is detachably coupled to a switching circuit that utilizes a predetermined one of said communication protocols is operatively coupled through said auxiliary connector arrangement to the auxiliary card.

3. An apparatus according to claim 2, wherein said plurality of communication protocols includes an asynchronous transport mode (ATM) protocol, which is said predetermined one of said communication protocols.

4. An apparatus according to claim 2, wherein said plurality of communication protocols includes an Internet protocol (IP) communication protocol, which is said predetermined one of said communication protocols.

5. An apparatus according to claim 2, wherein said plurality of communication protocols includes a virtual tributary (VT) communication protocol.

6. An apparatus according to claim 2, including a control circuit which is operatively coupled to said switching section, to said auxiliary connector arrangement, and to each of said universal connectors.

7. An apparatus according to claim 2, including:
   a plurality of further universal connectors which are each adapted to be selectively detachably electrically coupled to any of said types of switching circuits;
   a further switching section which is operatively coupled to each of said communication paths, said switching sections each being operatively coupled to each of said universal connectors through a respective one of said plurality of interfaces, and said further switching section being operative to route the segments of information from said communication path section which conform to each respective said communication protocol through a respective said interface to a respective said universal connector which has detachably coupled thereto one of said switching circuits which effects switching according to that respective said communication protocol; and
   a further auxiliary connector arrangement operatively coupled to each of said further universal connectors, said further auxiliary connector arrangement being adapted to be selectively detachably electrically coupled to a further auxiliary card in a manner so that one of said further universal connectors which is detachably coupled to a switching circuit that utilizes a selected one of said communication protocols is operatively coupled through said further auxiliary connector arrangement to a further auxiliary card which is detachably coupled to said further auxiliary connector arrangement.

8. An apparatus according to claim 1, including a plurality of interface circuits, said interface circuits each operatively coupling a respective said communication path to said switching section.

9. An apparatus according to claim 8, wherein interfaces between said switching section and said interface circuits are the same as said interfaces between said switching section and said universal connectors.

10. An apparatus according to claim 8, wherein each of said communication paths is a fiber optic path, and wherein each said interface circuit effects conversion of a respective said portion of said communication information between optical and electrical formats.

11. An apparatus according to claim 10, wherein said communication information is transmitted optically through said communication paths in the form of SONET frames, said SONET frames each including a plurality of said information segments, said interface circuits effecting said conversion of said SONET frames from optical to electrical format and then forwarding said SONET frames to said switching section, and said switching section extracting said information segments from said SONET frames received from said interface circuits.

12. A method of switching communication information which includes information segments, said information segments each conforming to one of a plurality of different communication protocols, comprising the steps of:

transmitting said communication information through a communication path section which includes a plurality of communication paths, including the step of causing each said communication path of said communication system to carry a respective portion of said communication information;

providing a plurality of universal connectors which are each adapted to be selectively detachably electrically coupled to any of a plurality of types of switching circuits, each said type of switching circuit carrying out switching according to a respective said communication protocol; and causing a switching section to route the information segments from said communication path section which conform to each respective said communication protocol through a respective interface to a respective said universal connector having detachably coupled thereto one of said switching circuits which effects switching according to that respective said communication protocol, wherein said interfaces are each the same.

13. A method according to claim 12, including the steps of:

providing an auxiliary connector arrangement which is operatively coupled to each of said universal connectors; and selectively detachably electrically coupling said auxiliary connector arrangement to an auxiliary card in a manner so that one of said universal connectors which is detachably coupled to a switching circuit that utilizes a predetermined one of said communication protocols is operatively coupled through said auxiliary connector arrangement to the auxiliary card.

14. A method according to claim 13, wherein said transmitting step includes the step of using an asynchronous transport mode (ATM) protocol as said predetermined one of said communication protocols.

15. A method according to claim 13, wherein said transmitting step includes the step of using an Internet protocol (IP) communication protocol as said predetermined one of said communication protocols.

16. A method according to claim 13, wherein said transmitting step includes the step of using a virtual tributary (VT) communication protocol as one of said plurality of protocols.

17. A method according to claim 13, including the steps of:

providing a plurality of further universal connectors which are each adapted to be selectively detachably electrically coupled to any of said types of switching circuits;

operatively coupling a further switching section to each of said communication paths; operatively coupling each of said switching sections to each of said universal connectors through a respective one of said interfaces;

causing said further switching section to route the information segments from said communication path section which conform to each respective said communication protocol through a respective said interface to a respective said universal connector which has detachably coupled thereto one of said switching circuits which effects switching according to that respective said communication protocol; and selectively detachably electrically coupling said further auxiliary connector arrangement to a further auxiliary card in a manner so that one of said further universal connectors which is detachably coupled to a switching circuit that utilizes a selected one of said communication protocols is operatively coupled through said further auxiliary connector arrangement to the auxiliary card.

18. A method apparatus according to claim 12, wherein said transmitting step includes the step of optically transmitting information through said communication paths in the form of SONET frames each containing a plurality of said information segments, converting said SONET frames from an optical to an electrical format in an interface circuit and then forwarding said SONET frames to said switching section, and then extracting said information segments from said SONET frames in said switching section.

* * * * *

UNITED STATES PATENT AND TRADEMARK OFFICE
CERTIFICATE OF CORRECTION

| | | |
|---|---|---|
| PATENT NO. | : 6,498,792 B1 | Page 1 of 1 |
| DATED | : December 24, 2002 | |
| INVENTOR(S) | : Gary P. Johnson et al. | |

It is certified that error appears in the above-identified patent and that said Letters Patent is hereby corrected as shown below:

<u>Title page,</u>
Item [75], Inventors, third inventor, after "Shimbashi" delete "Kawasaki" and insert -- Kanagawa --.
Item [56], References Cited, U.S. PATENT DOCUMENTS, thirteenth reference, after "5,812,796 A" delete "9/1998" and insert -- 08/1995 --.
OTHER PUBLICATIONS, tenth reference, delete "MMC Porducts," and insert -- MCC Products --.

<u>Column 3,</u>
Line 27, after "as", delete -- an --.

<u>Column 4,</u>
Line 47, after "present", insert -- at --.
Line 57, after "as", delete "such".

<u>Column 7,</u>
Line 10, after "use", insert -- of --.

Signed and Sealed this

Sixteenth Day of December, 2003

JAMES E. ROGAN
*Director of the United States Patent and Trademark Office*